United States Patent [19]

Nakagawa

[11] 4,305,963

[45] Dec. 15, 1981

[54] POWDERED MALT WORT BEVERAGE PRODUCT

[75] Inventor: Atsushi Nakagawa, Suita, Japan

[73] Assignee: Asahi Breweries Ltd., Tokyo, Japan

[21] Appl. No.: 108,928

[22] Filed: Dec. 31, 1979

[30] Foreign Application Priority Data

Sep. 11, 1979 [JP] Japan ................................ 54-116605

[51] Int. Cl.³ .......................... A23L 1/185; A23L 2/00
[52] U.S. Cl. ........................................ 426/29; 426/16; 426/44; 426/64; 426/593
[58] Field of Search ..................... 426/11, 16, 29, 471, 426/64, 593, 631, 52, 44

[56] References Cited

U.S. PATENT DOCUMENTS

| | | | |
|---|---|---|---|
| 979,810 | 12/1910 | Wahl | 426/29 |
| 1,235,881 | 8/1917 | Defren | 426/16 X |

FOREIGN PATENT DOCUMENTS 1248505 10/1971 United Kingdom .

OTHER PUBLICATIONS

De Clerck, J., A Textbook of Brewing, vol. one, Chapman & Hall, Ltd., London, 1957, (pp. 327-329, 445-446).

Amerine et al., The Technology of Wine Making, 3rd ed., The Avil Publ. Co., Inc., Westport, Conn., 1972, (pp. 584-589).

*Primary Examiner*—David M. Naff
*Attorney, Agent, or Firm*—Blanchard, Flynn, Thiel, Boutell & Tanis

[57] ABSTRACT

A powdered malt wort product for preparing beverages is produced by fermenting a brewer's malt wort with a lactic acid producing bacteria such as *Streptococcus faecalis* and then spray-drying the fermented wort. The resultant powdered fermented wort may be mixed with cocoa or chocolate, plus milk solids and sugar to produce a beverage.

13 Claims, 2 Drawing Figures

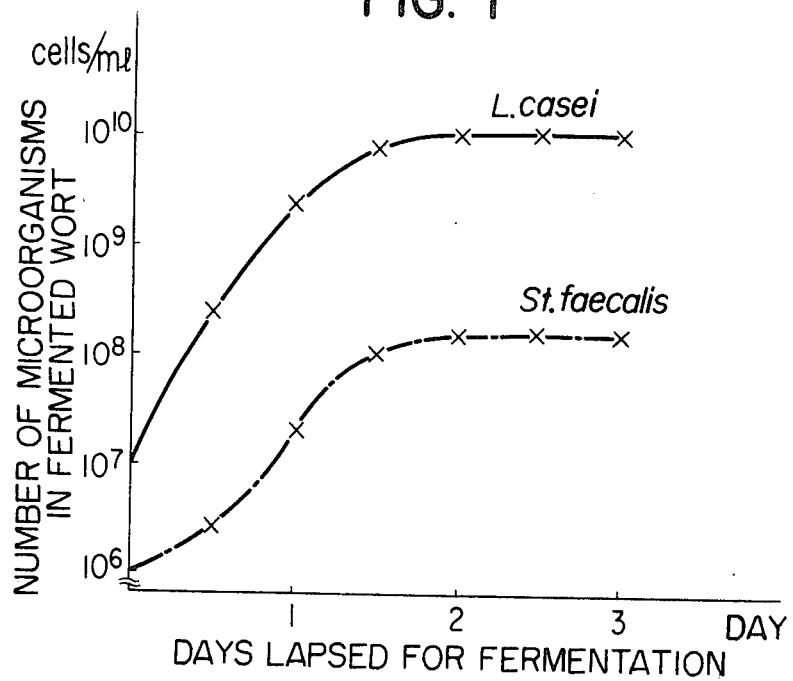
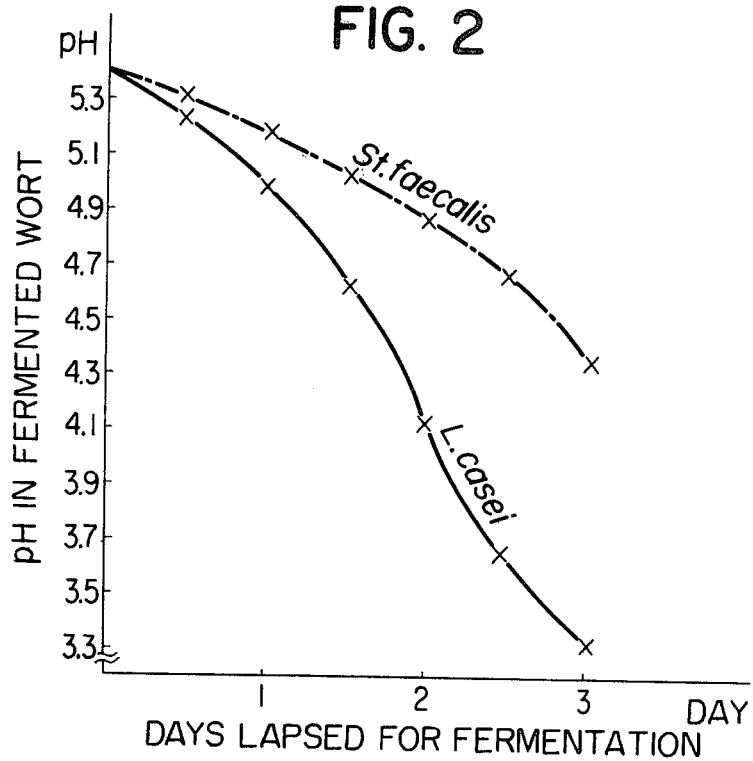

POWDERED MALT WORT BEVERAGE PRODUCT

BACKGROUND OF THE INVENTION

1. Field of the Invention

The present invention relates to drinks consisting essentially of a fermented mother liquor obtained by subjecting a wort to lactic acid fermentation and method of manufacturing same. More particularly, the object of the present invention is to provide hitherto entirely unknown lactic acid fermentation drinks, in particular beer-like drinks, by using worts having a taste peculiar thereto, and the method for manufacturing said drinks.

2. Description of the Prior Art

A wort contains various excellent nutritive elements, but on the other hand a wort before fermentation has a green odor and various unclean flavors. Due to this, the latter is not used directly for drinking, with the exception of an instance where it is used as hot malt jelly drinks, and it is put to a drinking use after having been fermented with yeasts.

Beer is an example of a drink obtained by fermentation of worts with yeasts and Kvass is an example of a drink obtained by adding sugar and water to malt, blacker and raisins and allowing the resulting mixture to ferment by the action of wild yeasts attached to said raisins.

SUMMARY OF THE INVENTION

We have studied lactic acid bacteria for many years, and have succeeded in achieving the present invention during the study of the fermentation of wort with lactic acid bacteria.

However, in the case of a hopped wort, a substantial lactic acid fermentation does not take place, and even in the case of a hop-free wort, a desirable fermentation is not always obtainable depending on the strains of lactic acid bacteria employed. We have discovered that only when fermentation is carried out by adding homofermentative lactic acid bacteria to said hop-free wort, does the fermentation proceed smoothly without being accompanied with the formation of alcohol, whereby a beverage can be obtained which has a refreshing taste and is free from the inherent green odor of the wort. When comparing this beverage with those resulting from fermentation using yeasts, it is observed that the quantity of vitamins remaining in the latter is small because the vitamin requirement is very high in the case of yeasts, and therefore, it is impossible to expect the nutritive effects as achieved by the present invention from the latter.

In other words, the diameter of lactic acid bacterium is in the range of from $0.8\mu$ to $1\mu$, which corresponds to about 1/10 of the diameter of yeast ranges from $7\mu$ to $8\mu$. Therefore, the volume of the former is 1/1000 of that of the latter. Moreover, since the vitamin requirement of lactic acid bacteria is also not as high as yeasts, the number of microorganisms remaining after fermentation is about $10^{8\sim10}$ as seen in the present invention and so the total quantity of nutritive source stored in the microorganisms is not so much, whereby the nutritive value contained in the resulting beverage is almost equivalent to those contained in the wort and malt extract.

As is evident from the above, it may be said that the present invention has discovered how to remove the green odor from the wort before fermentation without losing almost any nutritive substance contained therein.

The beverage thus obtained according to the present invention has hitherto been entirely unknown. The aforesaid Kvass is a beverage containing a large quantity of lactic acid bacteria as the result of having been allowed to ferment using plural kinds of microorganisms.

In more detail, Kvass is prepared by adding raisins or the like to the main raw material, i.e., stale bread of the so-called blacker (rye bread), one of the principal Russian foods, and allowing the resulting mixture to ferment. As a result, lactic acid bacteria are arranged to be present therein in admixture with film forming yeasts, wine yeasts, etc.

DESCRIPTION OF THE PREFERRED EMBODIMENTS

The gist of the present invention is as stated in the accompanying claims. Next, it will be explained in accordance with the sequence of manufacture.

FIG. 1 is a graph illustrating the relation between the fermentation progress and the number of microorganisms.

FIG. 2 is a graph illustrating the relation between the fermentation progress and the pH of the beverage.

First, the wort employed as the fermentation material in the present invention can be obtained by the same process as employed usually for the manufacture of wort in breweries. However, the wort suitably employed in the present invention is preferred to be freed from hops and to have an extract concentration in the range of from 5% to 18%, preferably in the range of from about 10% to 16%.

The lactic acid bacteria suitably employed in the present invention include homofermentative lactic acid bacteria, for instance, such as *Lactobacillus casei, Streptococcus faecalis* and the like.

With reference to heterofermentative lactic acid bacteria, those use is accompanied with the formation of alcohol, the sole as well as joint use thereof should exclusively be avoided in the case of manufacturing refreshing drinks according to the present invention.

In carrying out the fermentation, it is desirable that the quantity of a starter added, though depending on the properties of said starter, for instance in the case of *Streptococcus faecalis*, should be about $1 \times 10^6$ cells per ml of wort and in the case of *Lactobacillus casei* should be about $1 \times 10^7$ cells per ml of wort.

The fermentation is carried out at a temperature in the range of from about 25° C. to 40° C. Preferably in the range of from 35° C. to 37° C. Preferably, however, it should be approximately 37° C. taking account of the growth condition for bacteria. When the temperature is too low, the fermentation is delayed. On the other hand, when the temperature is too high, the growth of bacteria is disturbed. The fermentation, when carried out at a temperature of about 37° C., is completed in about 3 days.

The fermented wort is subjected to centrifuging, filtration through a layer of diatomaceous earth or the like, for separating microorganisms therefrom. The thus obtained beverage is transparent and light yellowish brown, like beer, and it has a pleasant and clean taste but it is liable to formation of chill haze. Due to this, it is desirable that separation of the microorganisms should be effected after the fermented wort is added with papain or the like and left to stand.

Further, since the present invention utilizes the lactic acid bacteria, having an intestinal regulation effect, for the fermentation of wort, the resulting fermented wort can also be put to a drinking use in the so-called raw state before the microorganisms are separated therefrom. In this case, the lactic acid formed during the fermentation of wort is stored in the fermented wort to thereby elevate the acidity thereof. However, since the growth and fermentation of the lactic acid bacteria are suppressed as the acidity rises, apart from the occurrence of white turbidity owing to microorganisms, there is no fear that the acidity of the fermented wort may be extremely elevated and thus the product is naturally arranged to have a pleasant flavor, whereby a health drink can be obtained which contains a large quantity of active lactic acid bacteria. The thus obtained beverage per se can be put to a drinking use. In order to increase the product value and also in order that the product may have a desirable standard in respect of the number of microorganisms and taste, however, it is subjected to further treatments such as concentration controlling, seasoning with sweetness and spice or imparting of dissolved carbonic acid gas. The solid ingredients obtained at the time of separating the solid content from the fermented wort are almost composed of the aforesaid active lactic acid bacteria, while in the case where the above-mentioned *Lactobacillus casei* or *Streptococcus faecalis* has been employed, the aforesaid lactic acid bacteria per se possess an excellent intestinal regulation effect, and so are of wide utility value such that the separated solid ingredients per se are utilized as intestinal regulation drugs or they are refined, dried and then made into tablets.

Seasoning with sweetness is normally effected by means of sucrose, but different sugars may be employed for that purpose. The quantities of sugars used may be suitably determined, preferably said quantities may be determined, like perfumes, depending on the products aimed at. The perfumes may be selected freely. However, it appears that fruit type perfumes such as ginger essence, lime, lemon, etc. are suitable. Imparting of carbonic acid gas may be readily effected by conventionally pressing and dissolving said gas into the product in an optional volume determined depending on the desired product, preferably about twice as large a volume of carbonic acid gas at 0° C. The drinks according to the present invention, wherein carbonic acid gases are present in the dissolved state, bear a close resemblance to beer in respect of not only color but also foaming and foam-durability, and therefore may be said to be very unique refreshing drinks.

The above explanations were made with respect of liquid drinks. Next, reference will be made about concentrated drinks or powdery drinks which fall within the scope of the present invention. The term "concentrated drinks" or "powdery drinks" used herein means those which are normally in concentrated or powdery state and are dissolved with hot water or the like when they are to be put to a drinking use.

The steps for manufacturing the concentrated or powdery drinks according to the present invention are identical with the liquid drinks in respect of the steps up to the fermentation. However, the fermented wort, as it is or after the microorganisms are separated, is concentrated or spray-dried without addition of special additives. The resulting concentration or powder is added with various soluble additives to obtain a product.

And, when this product is used in admixture with cocoa, milk or the like, the drinking liquid is not required to be transparent, consequently there is no special necessity for separating microorganisms therefrom.

Particularly, since the pH of the fermented wort, as shown in the examples, has no possibility of being lowered to 4.0 or less, it can be mixed with a milk liquid such as creaming powder without causing a coagulation phenomenon, thereby providing an excellent drink. In the case of the fermented wort according to the present invention, furthermore, the nutritive substances contained in the wort are not lost, and the green odor and various unclean flavors of the wort before fermentation are removed therefrom as already described hereinbefore.

The green odor and various unclean flavor of the wort before fermentation can not be removed even when the wort is concentrated into a malt extract or is dehydrated and pulverized into a powder. As shown in the panel test results referred to hereinafter, even when the product is used in admixture with cocoa or chocolate, this green odor can not be removed in so far as the product is mainly composed of malt extract or dehydrated powder.

Concerning this, in view of the fact that the fermented wort of the present invention is deprived of the green odor and various unclean flavors of the wort before fermentation, while holding the nutritive substances to the same extent as the wort, if the malt extract or dehydrated powder of the fermented wort according to the present invention is utilized as a substitute for the malt extract which constitutes the principal component of hitherto commercially available malt nourishing drinks, it will be seen that a product can be obtained which has nearly the same nutritive value as the conventional products and additionally has an extremely improved taste in comparison therewith.

Taking some instances, the ingredients indicated on presently commercially available malt nourishing drinks will be shown as follows.

| Marketed Product O | Marketed Product M |
|---|---|
| malt extract | malt extract (principal component) |
| pure creaming powder | sugar |
| sugar | minerals |
| cocoa | vitamins |
| egg | chocolate flavor |
| honey | |

Hereinafter, the present invention will be explained with reference to the embodiment thereof.

EXAMPLE

A hop-free cooled wort having an extract concentration 16% was added with *Lactobacillus casei* in the case of manufacturing refreshing drinks and with *Streptococcus faecalis* in the case of manufacturing powder drinks. The resulting mixtures were cultured at 37° C. for 3 days respectively.

The fermentation development in the respective cases are as illustrated in FIG. 1 and FIG. 2. FIG. 1 illustrates the increase of microorganisms against the number of days elapsed for fermentation, and FIG. 2 illustrates the lowering of the pH of the wort against the number of days elapsed for fermentation.

After the fermentation was completed, refreshing drinks or powder drinks were manufactured for trial from the fermented wort using *Lactobacillus casei* (whose pH is below 4) or the fermented wort using *Streptococcus faecalis* (whose pH is above 4) in accordance with the following procedures respectively.

(1) Trial manufacture of beer-like refreshing drink (using *L. casei*)

20 ppm of papain was added to the fermented wort at the end of fermentation. And, the resulting mixture was left to stand at 0° C. through the night, thereafter subjected to centrifuging thereby separating microorganisms therefrom, and then filtered through a layer of diatomaceous earth thereby preparing an original beverage.

The pH of the transparent original beverage was 3.34 and the acidity thereof was about 1 g as lactic acid per 100 ml of the sample. This original beverage was added with water in a quantity about twice as much as that, then with sugar in such a quantity that the total sugar concentration may be 7%, further with 0.1 ppm of ginger essence. Thereafter, about twice as large a volume of carbonic acid gas was pressed into the beverage, and it was bottled and capped.

The bottle was uncapped and the bottled sample was poured in a cup. It was proved to be refreshing drink which had apparently a close resemblance to beer as well as a peculiar flavor.

(2) Trail manufacture of powder drink (using *Str. faecalis*)

After the completion of fermentation, microorganisms were separated from the fermented wort and then the same was treated so as to be transparent.

The thus obtained beverage (whose pH is 4.2) was spray-dried. The spray-drying treatment was conducted under the conditions: drying chamber inlet temperature 101° C. to 103° C., indoor temperature 77° C. to 85° C., and outlet temperature 68° C. to 73° C. As a result, there was obtained a dry powder which exhibited no traces of the green odor and various unclean flavors. Cocoa, creaming powder and sugar was mixed therewith to thereby obtain a manufacture for trial. Hot water was poured in this manufacture and the same was served for a trial drinking.

The percentages of the respective ingredients contained in the trial manufacture put to a trial drinking use are as follows.

| Percentages of ingredients of powder drink manufactured for trial (percentages of respective ingredients dissolving in 100 ml of hot water) | |
|---|---|
| dry powder of beverage | 5 g |
| sugar (product on the market) | 2 g |
| cocoa (product on the market) | 1 g |
| creaming powder (product on the market) | 2 g |
| | 10 g |

As the pH of the beverage dissolved in hot water is not low there is not noted any phenomenon that a part of the creaming powder coagulates.

Five panelists skilled in tasting tests have made comparative investigations between the malt powder drink on the market and the above-described trial manufacture, both having been processed to be the liquid drinks as predetermined. The results obtained from this comparative test are as mentioned below. It is clearly noted therefrom that the product according to the present invention is deprived of the green odor and unclean flavors peculiar to the wort before fermentation.

| Panel Test Results (Evaluations made by five panelists) | | | |
|---|---|---|---|
| Tested product | O | M | Our invention |
| Flavor | Unfermented wort green flavor was observed. | Unfermented wort green flavor was observed. | cocoa flavor |
| Taste | strong taste of creaming powder was observed | various unclean tastes were observed | various unclean tastes were not observed |

What is claimed is:

1. A powdered malt wort product adapted to be mixed with cocoa or chocolate, plus milk solids and sugar, and then dissolved in water to form a beverage, said product being prepared by a process consisting essentially of inoculating a fermentable brewer's malt wort having an extract concentration of from 5 to 18%, with a lactic acid producing bacteria consisting of *Streptococcus faecalis* in an amount effective for fermenting the wort; then fermenting the wort at a temperature of from about 25° C. to about 40° C. to obtain a fermented wort having a pH above 4.0; and then spray-drying the fermented wort to obtain the powdered malt wort product.

2. A powdered malt wort product as claimed in claim 1 in which said temperature is from 35° to 37° C.

3. A powdered malt wort product as claimed in claim 1 in which said brewer's wort is free of hops.

4. A powdered malt wort product as claimed in claim 1 in which the fermented wort is spray-dried without removing said bacteria from the fermented wort.

5. A powdered malt wort product as claimed in claim 1 in which the fermented wort is spray-dried after removing said bacteria from the fermented wort.

6. A beverage powder adapted to be dissolved in water to form a beverage comprising a powdered malt wort product as claimed in claim 1 mixed with sugar, milk solids and cocoa or chocolate.

7. A powdered malt wort product as claimed in claim 1 in which the brewer's malt wort is inoculated with about $1 \times 10^6$ cells of *Streptococcus faecalis* per ml of the brewer's malt wort.

8. A process for preparing a powdered malt wort product which consists essentially of inoculating a fermentable brewer's malt wort having an extract concentration of from 5 to 18%, with a lactic acid producing bacteria consisting of *Streptococcus faecalis* in an amount effective for fermenting the wort; then fermenting the wort at a temperature of from about 25° C. to about 40° C. to obtain a fermented wort having a pH above 4.0; and then spray-drying the fermented wort to obtain the powdered malt wort product.

9. A process as claimed in claim 8 in which said temperature is from 35° to 37° C.

10. A process as claimed in claim 8 in which said brewer's malt wort is free of hops.

11. A process as claimed in claim 8 in which the fermented wort is spray-dried without removing said bacteria from the fermented wort.

12. A process as claimed in claim 8 in which the fermented wort is spray-dried after removing said bacteria from the fermented wort.

13. A process as claimed in claim 8 in which the brewer's malt wort is inoculated with about $1 \times 10^6$ cells of *Streptococcus faecalis* per ml of the brewer's malt wort.

* * * * *